US011003057B2

(12) United States Patent
Buttimer

(10) Patent No.: US 11,003,057 B2
(45) Date of Patent: May 11, 2021

(54) ARTICULATED STABILIZER FRAME WITH MAGNETIC ATTACHMENT FOR MONOPOD

(71) Applicant: Gerald F Buttimer, Indian Head Park, IL (US)

(72) Inventor: Gerald F Buttimer, Indian Head Park, IL (US)

(*) Notice: Subject to any disclaimer, the term of this patent is extended or adjusted under 35 U.S.C. 154(b) by 0 days.

(21) Appl. No.: 16/124,422

(22) Filed: Sep. 7, 2018

(65) Prior Publication Data

US 2019/0004404 A1    Jan. 3, 2019

Related U.S. Application Data

(63) Continuation-in-part of application No. 14/867,760, filed on Sep. 28, 2015, now Pat. No. 10,095,092.

(60) Provisional application No. 62/218,343, filed on Sep. 14, 2015.

(51) Int. Cl.
| | |
|---|---|
| *G03B 17/56* | (2021.01) |
| *F16M 13/04* | (2006.01) |
| *F16M 13/02* | (2006.01) |
| *F16B 1/00* | (2006.01) |
| *A61G 5/10* | (2006.01) |
| *A47C 7/62* | (2006.01) |
| *F16M 11/20* | (2006.01) |
| *F16M 13/00* | (2006.01) |
| *F16M 11/10* | (2006.01) |
| *F16M 11/28* | (2006.01) |

(52) U.S. Cl.
CPC .............. *G03B 17/561* (2013.01); *A47C 7/62* (2013.01); *A61G 5/10* (2013.01); *F16B 1/00* (2013.01); *F16M 11/10* (2013.01); *F16M 11/2014* (2013.01); *F16M 11/28* (2013.01); *F16M 13/00* (2013.01); *F16M 13/022* (2013.01); *F16M 13/04* (2013.01); *A61G 5/1094* (2016.11); *F16B 2001/0035* (2013.01)

(58) Field of Classification Search
CPC ... G03B 17/561; G03B 17/563; Y10T 16/466; Y10T 16/4713; A61G 5/10
See application file for complete search history.

(56) References Cited

U.S. PATENT DOCUMENTS

| | | | |
|---|---|---|---|
| 1,957,033 A | | 1/1934 | Silverman |
| 4,963,904 A | | 10/1990 | Lee |
| 5,476,241 A | * | 12/1995 | Helman ................ F16M 11/24 248/286.1 |
| 5,538,212 A | | 7/1996 | Kennedy |
| 5,664,750 A | | 9/1997 | Cohen |
| 5,705,578 A | | 1/1998 | Peifer et al. |
| 5,742,859 A | | 4/1998 | Acker |
| 5,749,010 A | | 5/1998 | McCumber |

(Continued)

FOREIGN PATENT DOCUMENTS

JP       2003322905 A    * 11/2003    ............. G03B 17/56

*Primary Examiner* — Noam Reisner
(74) *Attorney, Agent, or Firm* — Erickson Kernell IP, LLC; John C McMahon

(57) ABSTRACT

A camera support apparatus includes a telescopically collapsible monopod, a pad sized and shaped to be set on by a user, especially a user in a wheelchair and a center mount assembly having a magnet that is selectively interconnectably joined between the pad and the monopod. When used with a wheelchair, the wheelchair preferably includes a magnetically attachable side mount to secure the monopod to the side when not in use.

5 Claims, 8 Drawing Sheets

(56) References Cited

U.S. PATENT DOCUMENTS

| | | |
|---|---|---|
| 5,839,704 A | 11/1998 | Appleman |
| 6,021,984 A | 2/2000 | Mills |
| 6,123,306 A * | 9/2000 | Jackson .................. B62J 11/00 |
| | | 248/187.1 |
| 6,962,313 B1 | 11/2005 | Marks, Jr. |
| 7,232,265 B1 | 6/2007 | Price |
| 7,244,070 B2 | 7/2007 | Burnett et al. |
| 8,152,389 B1 | 4/2012 | Lammens |
| 2002/0001470 A1 | 1/2002 | Linnecke |
| 2007/0031143 A1 | 2/2007 | Riccardi |
| 2009/0174232 A1 | 7/2009 | Hoffman |
| 2010/0153061 A1 | 6/2010 | Hietmann |
| 2011/0045918 A1* | 2/2011 | Park .................... A63B 69/3608 |
| | | 473/218 |
| 2011/0173778 A1 | 7/2011 | Wales |
| 2011/0192951 A1 | 8/2011 | Gooch |
| 2013/0004153 A1 | 1/2013 | McKee |
| 2013/0047802 A1 | 2/2013 | Vierck |
| 2013/0233988 A1 | 9/2013 | Johnson |
| 2015/0316837 A1 | 11/2015 | Maltese |
| 2016/0180750 A1* | 6/2016 | Ports ..................... A47F 5/0068 |
| | | 40/711 |
| 2017/0068149 A1* | 3/2017 | Fromm ................ F16M 11/041 |
| 2017/0075199 A1* | 3/2017 | Buttimer .............. G03B 17/563 |

\* cited by examiner

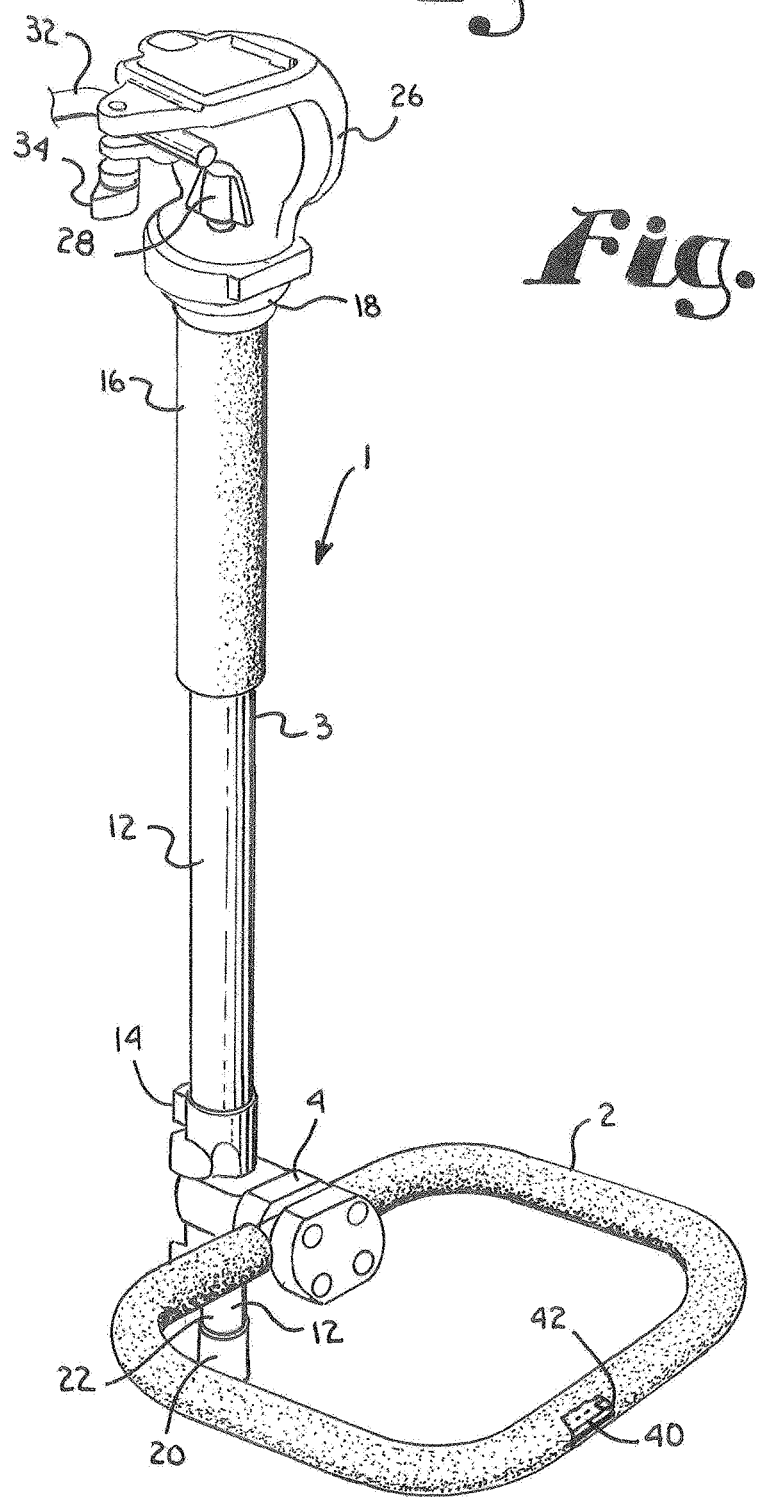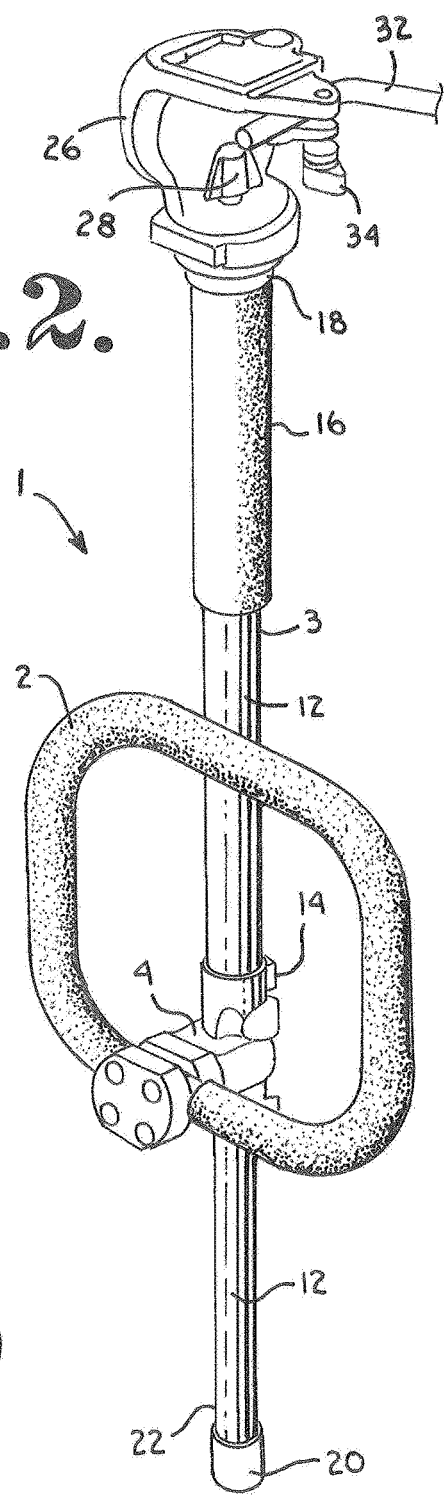

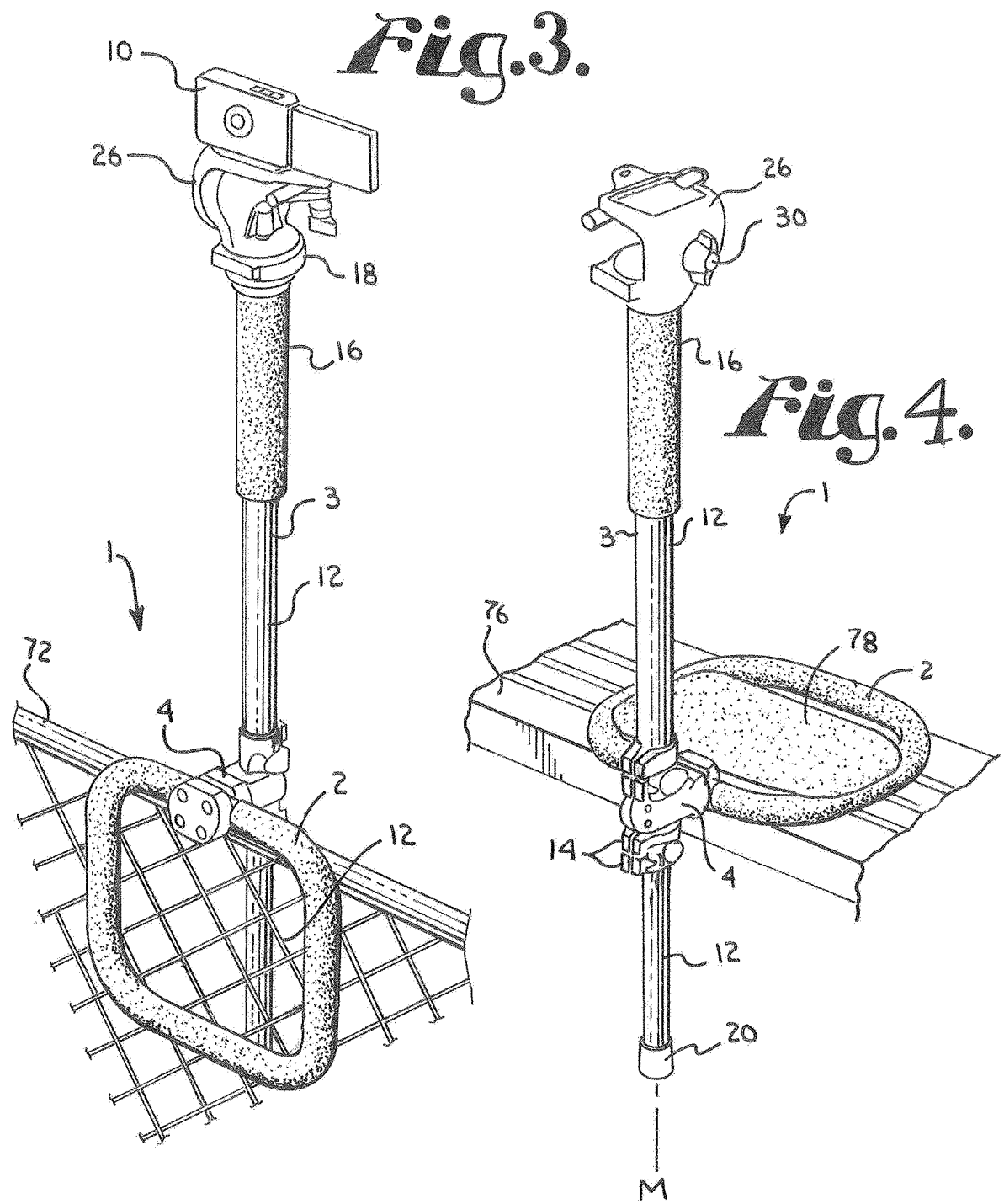

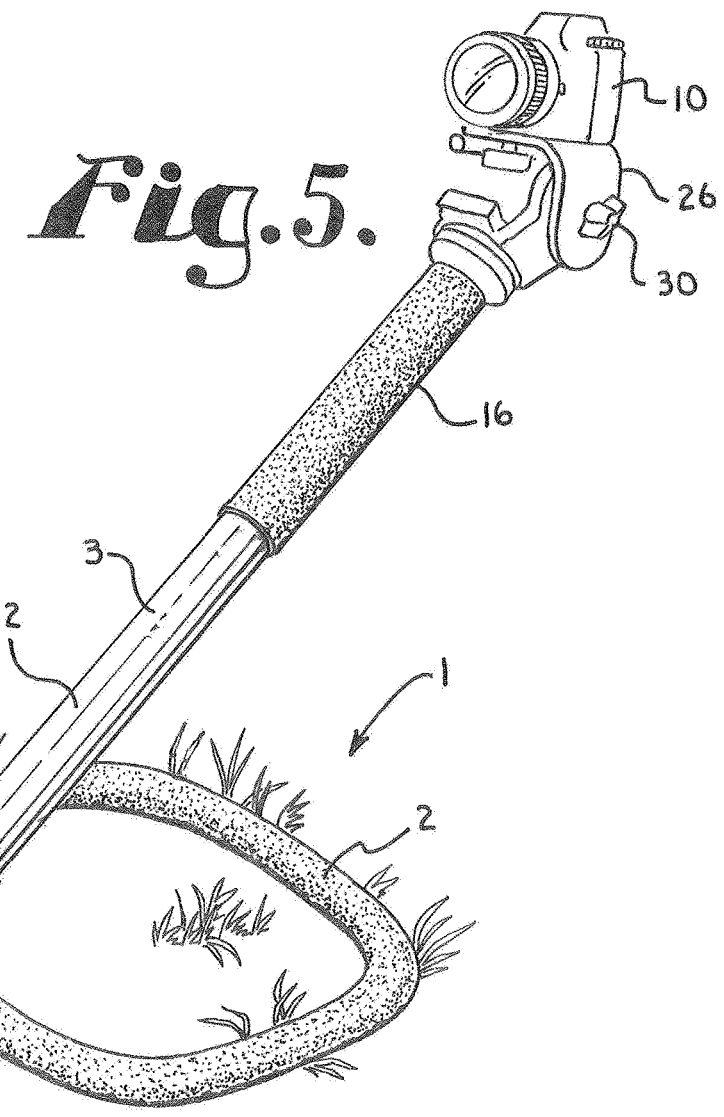
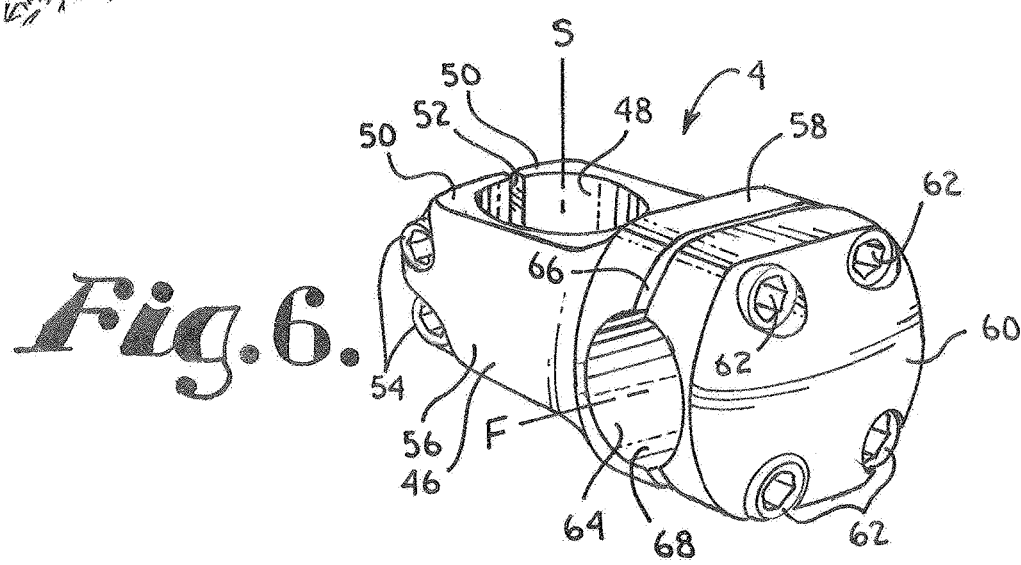

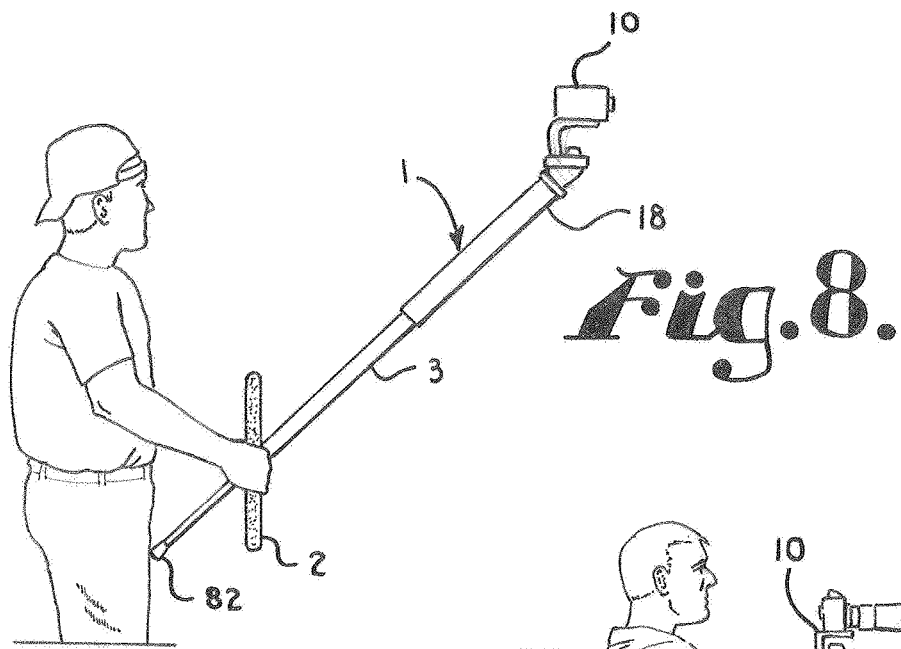
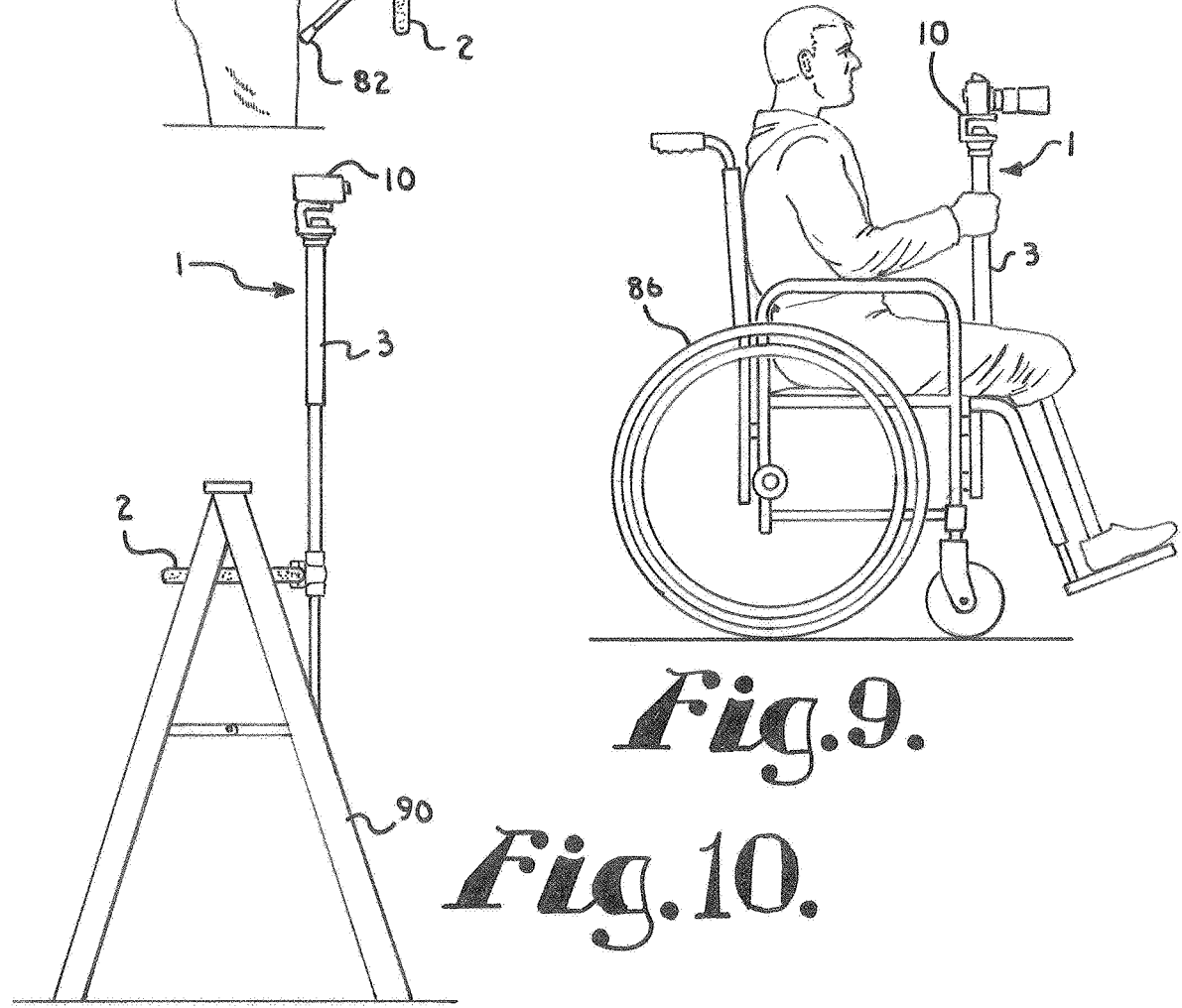
Fig.8.
Fig.9.
Fig.10.

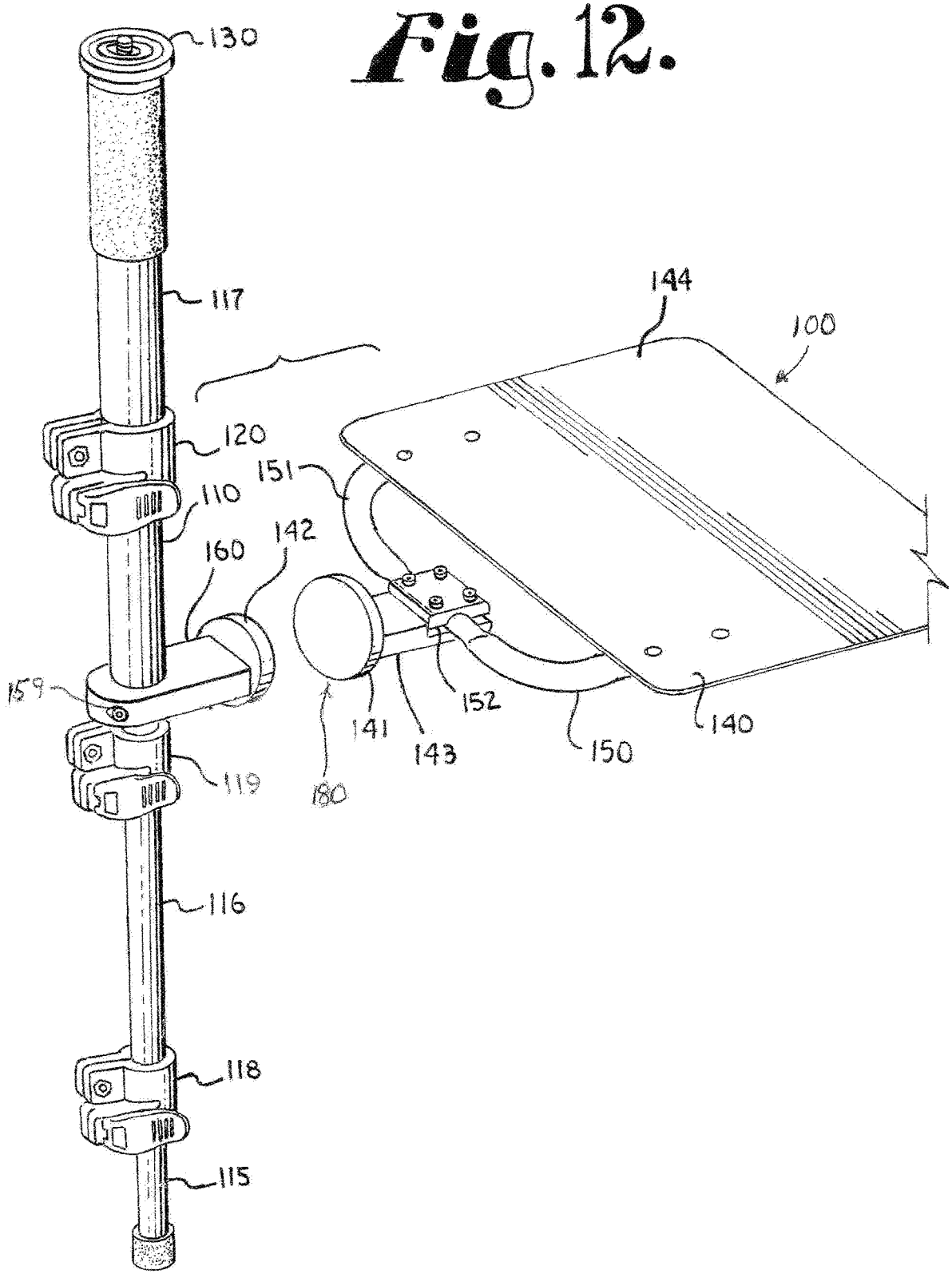

ARTICULATED STABILIZER FRAME WITH MAGNETIC ATTACHMENT FOR MONOPOD

CROSS-REFERENCE TO RELATED APPLICATIONS

This application is a continuation-in-part of U.S. patent application Ser. No. 14/867,760, filed Sep. 28, 2015 which claims the benefit of U.S. Provisional Patent Application Ser. No. 62/218,343 filed Sep. 14, 2015 and, both of which are incorporated by reference herein.

BACKGROUND OF THE INVENTION

The present invention is broadly concerned with improvements in photographic equipment and, more particularly, to improvements in monopod support devices for cameras.

While satisfactory images are often recorded using handheld cameras, the quality of still and moving images is often improved by steady support of the camera recording the images. Handheld image capture devices such as smart phones, cameras, camcorders, and the like are prone to shake, shudder, and vibration. This negative effect is magnified when zooming in on a subject, as is often done in photography for sports, action news events, art, nature, and the like. Disabled persons, especially those in wheel chairs, often encounter camera stability problems.

Historically, cameras have been supported by structures having multiple legs, such as tripods. The widely spaced points of ground contact of a tripod provide a stable platform for a camera against vertical and lateral forces. However, tripods tend to be relatively heavy, take up a considerable ground or floor area, and can be trip hazards to persons not aware of their presence. The use of tripods can be awkward in tiered type seating structures such as bleachers, stadiums, and the like. Tripods normally fail to provide enough space at ground level for approach and use by a person in a wheelchair. For these reasons, tripods are sometimes restricted at many public events and venues, such as sporting events and the like.

In order to overcome some of the problems associated with tripods, other types of camera support structures have been developed, such as monopods, also known as unipods. As the name implies, a monopod is a single legged structure. Typical monopods are telescopically collapsible and have means to releasably attach a camera thereto, such as a pan and tilt head which enables pivoting the attached camera about vertical and horizontal axes. Monopods tend to be lighter in weight and more compact than tripods and take up less space when deployed. While a monopod supports the weight of a camera and, thus, steadies it vertically, undesired movement and shaking of the camera in lateral directions is still possible. Stability is especially problematic among the disabled or infirm. While wheelchairs and the like often make it possible for disabled to move about, they are often unable to hold a camera or other device stable, even while in a wheelchair.

SUMMARY OF THE INVENTION

The present invention provides embodiments of an improved camera support apparatus incorporating an elongated camera support, such as a monopod, and an articulated stabilizer frame which provides improved stability for a camera supported on the apparatus. An embodiment of the support apparatus includes a monopod camera support member, a clamp structure including a camera support clamp adapted to secure the clamp structure to the monopod, a stabilizer frame member, and the clamp structure including a frame clamp adapted to secure the frame member to the clamp structure.

In an embodiment of the support apparatus, the frame clamp frictionally engages the frame member in such a manner as to enable selective angular articulation of the frame member relative to the monopod. Preferably, the frictional engagement is of such a character as to retain the frame member at a set angle relative to the monopod and to enable the friction to be overcome to enable manual repositioning of the frame member through a range of angles between the frame member and the monopod.

In an embodiment of the support apparatus, the stabilizer frame member is of a rectangular loop shape, such as a square loop shape. The stabilizer loop may be covered in a vibration damping material and may have a seat pad extending thereacross to enable the apparatus to be stabilized by a photographer sitting on the stabilizer loop. The support clamp has a support clamp axis, and the frame clamp has a frame clamp axis. In an embodiment of the support apparatus, the frame clamp axis is positioned in spaced relation to the support clamp axis to facilitate stabilization of the support apparatus by folding the stabilizer loop down to enable the support apparatus to be supported on a horizontal structure, such as a fence or the like.

In an embodiment of the support apparatus, the monopod is telescopically collapsible such that the overall length thereof can be varied from a completely collapsed state to a fully extended state. The monopod may include a pan and tilt head to facilitate aiming of the camera to follow a moving subject.

In another embodiment of the camera support apparatus, a camera support apparatus includes a frame or pad of sufficient two dimensional length to allow a user to set on the pad. A shaft is secured to and projects outwardly and forwardly of the pad and holds a member that is a first of a magnet or a material that is attracted to a magnet (target) on an end of the shaft opposite the pad, such that the member is positionable to extend forward of a user during use. A monopod is provided that includes a second of the magnet or material that is attracted to a magnet which is securely attached to the monopod. In use the magnet and material that is attracted to the magnet are joined so as to hold the monopod in a very stable configuration relative to the user, such that the user can use a camera mounted on the monopod without significant vibration because the wheelchair and person sitting hereon tend to damper any side to side vibration, while the bottom of the monopod rests on the ground or a support surface.

A further modified embodiment of the prior support includes wherein the magnet has a high magnetic field generating rare earth magnet and the pad is placed on or under the cushion of a wheelchair. The wheelchair further includes a secondary shaft with a magnet or magnetically attracted material that is fixedly attached to the wheelchair to function as a carrier of and support for the monopod when the monopod is disconnected from the shaft on the pad.

Various objects and advantages of the present invention will become apparent from the following description taken in conjunction with the accompanying drawings wherein are set forth, by way of illustration and example, certain embodiments of this invention.

The drawings constitute a part of this specification, include exemplary embodiments of the present invention, and illustrate various objects and features thereof.

BRIEF DESCRIPTION OF THE DRAWINGS

FIG. 1 is a perspective view of a monopod camera support apparatus including an embodiment of an articulated stabilizer frame of the present invention shown in a horizontal orientation.

FIG. 2 is a perspective view of the monopod camera support apparatus with the stabilizer frame shown in an upwardly folded orientation.

FIG. 3 is a perspective view of the apparatus at reduced scale with the stabilizer frame shown in a downwardly folded orientation to engage a horizontal support structure.

FIG. 4 is a perspective view of the apparatus with the stabilizer frame shown in a horizontal orientation on a seating bench and having a seat pad engaged therewith to enable steadying of the apparatus by a seated photographer (not shown).

FIG. 5 is a perspective view of the apparatus with the monopod telescopically collapsed and the stabilizer frame folded to an angular orientation to form a ground support for a camera.

FIG. 6 is a greatly enlarged perspective view of an embodiment of clamp assembly to secure the stabilizer frame to the monopod.

FIG. 8. is a diagrammatic side elevational view of the apparatus, shown in use with a belt worn flagpole support cup to support a lower end of the monopod while the stabilizer frame is manually grasped.

FIG. 9 is a view similar to FIG. 8 and shows the apparatus in use by a photographer seated on the stabilizer frame in a wheelchair.

FIG. 10 is a view similar to FIG. 8 and shows the apparatus with the stabilizer frame engaged with a ladder to steady a camera mounted on the apparatus.

FIG. 12 is a perspective view further embodiment of a support having a monopod and a pad in accordance with the present invention with elements thereof shown spaced from each other.

DETAILED DESCRIPTION OF THE INVENTION

Figure 7:
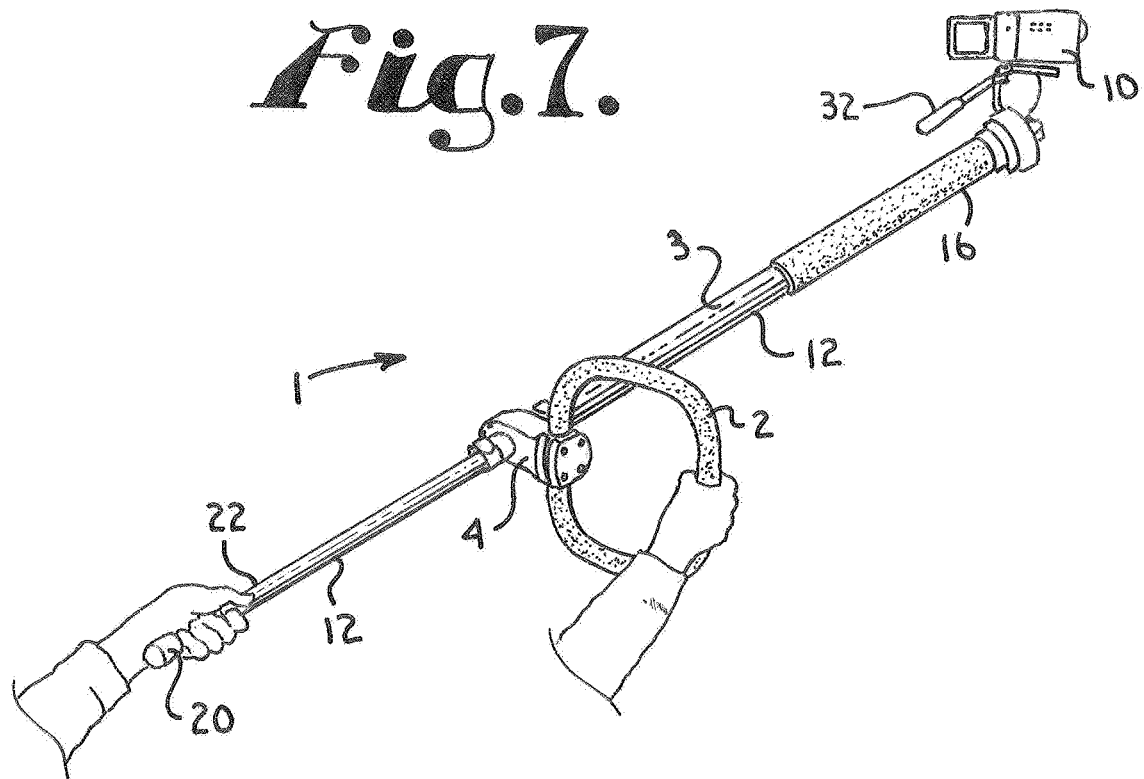
FIG. 7 is a perspective view at a reduced scale and shows the apparatus with the monopod fully extended and the stabilizer frame folded out from the monopod to enable use of the apparatus as a camera support boom.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 generally designates an embodiment of a camera support apparatus incorporating an articulated stabilizer frame 2 according to the present invention. The apparatus 1 generally includes an elongated camera support member or monopod 3 and a clamp structure 4 which joins the stabilizer frame or loop 2 to the monopod 3 in such a manner as to enable articulation of the loop 2 with respect to the clamp structure 4 and the monopod 3.

The monopod 3 may be a conventional monopod camera support member adapted for supporting a camera 10 (FIGS. 3, 5, and 7. The illustrated monopod 3 includes multiple telescoping sections 12 which can be selectively extended or retracted by the use of section clamp mechanisms 14. The section clamp mechanisms 14 may be conventional types of clamp mechanisms which be operated to compress or release a split end (not shown) of a monopod section 12 where it engages an adjacent section 12. The illustrated monopod 3 is shown with a padded sleeve 16 near an upper end 18 thereof and a padded tip or cap 20 at a lower end 22 thereof.

The monopod 3 includes structure or a mechanism for releasably attaching the camera 10 thereto. The illustrated monopod 3 includes a pan and tilt head 26 secured to the upper end 18 thereof. The illustrated pan and tilt head 26 is a type of gimbal apparatus which enables pivoting or panning the camera 10 about a longitudinal axis M (FIG. 4) of the monopod and tilting the camera 10 about a tilt axis T. The illustrated head 26 includes a pan lock screw 28 (FIG. 1) to lock the head 26 at a selected pan angle and a tilt lock screw 30 (FIG. 4) to lock the head at a desired tilt angle. The screws 28 and 30 can also be used to adjust the tightness or looseness of the head respectively in the pan and tilt functions of the head 26. The head 26 may also include a viscous damping arrangement (not shown) to smooth panning and tilting actions of the components of the head. The pan lock screw 28 may also function to enable the head 26 to be removed from the monopod 3. The illustrated pan and tilt head 26 includes a control arm 32 (FIGS. 2 and 7) to facilitate operation of the head. Orientation of the control arm 32 may be adjusted using a control arm screw 34.

The illustrated stabilizer frame 2 is a square loop which is pivotally connected to the clamp structure 4. It is foreseen that the frame 2 could alternatively have a non-square rectangular shape, a circular shape, an oval shape, or the like. The illustrated loop 2 is formed of a tubular structural member 40 having a circular cross section which is formed into the desired shape. The structural member 40 may be formed of a metallic material, such as an aluminum alloy, and is padded by a vibration damping sleeve or coating 42, such a foam polymer. The padded sleeve 42 stops short of the clamp structure 4 to avoid interference therewith. Ends (not shown) of the structural member 40 may meet in opposed relation within the clamp structure 4.

Referring particularly to FIG. 6, the illustrated clamp structure 4 includes a clamp body 46 which may be formed of a material such as an aluminum alloy. The clamp body 45 has a substantially cylindrical camera support bore 48 formed therethrough along a camera support bore axis S. Camera support clamp jaws 50 are formed at an end of the clamp body and are separated in opposed relation by an end gap 52. Fasteners 54, such as screws, are threaded into the jaws 50 which are sufficiently resilient that tightening of the screws 54 draws the jaws 50 toward one another to clamp the clamp structure 4 onto the monopod 3. The camera support bore 48, clamp jaws 50, and screws 54 cooperate to form a camera support clamp 56.

An enlargement at an opposite end of the illustrated clamp structure 4 forms an inner frame bearing plate 58. An outer frame bearing plate 60 is secured to the inner bearing plate 58 by pairs of threaded fasteners or screws 62. A substantially cylindrical frame clamp bore 64 is formed through the inner and outer bearing plates 58 and 60 along a frame clamp bore axis F, which is substantially perpendicular to the camera support bore axis S. The inner and outer bearing plates 58 and 60 are separated by a frame clamp gap 66. Tightening of the screws 62 reduces the frame clamp gap 66 to secure the clamp structure 4 about the structural member 40 of the frame clamp loop 2. The inner and outer bearing plates 58 and 60 and the screws 62 form a frame clamp 68.

Typically, the camera support clamp 56 is tightened about the monopod 3 such that the clamp structure 4 does not move relative to the monopod. In an embodiment of the apparatus 1, the frame clamp 68 is tightened to enable continuous angular articulation of the loop 2 relative to the monopod 3 through a range of angles. Friction between the frame clamp 68 and the loop 2 is of such a character as to retain the loop 2 at a set angle relative to the monopod 3 and to enable the friction to be overcome so that the loop 2 can be selectively repositioned relative to the monopod 3. This is somewhat similar to the frictional relationship between the display and body of a laptop computer, with a higher level of friction between the frame clamp 68 and the loop 2 because of the weights of the components involved.

It is also foreseen that the camera support clamp 56 could be manually released to enable alternative positioning of the loop 2 along the monopod 3. Additionally, it is foreseen that the frame clamp 68 could employ manually adjustable screws 62 so that the frame clamp 68 could be tightened to secure the loop 2 in a desired angular orientation relative to the monopod 3. Such variations are intended to be encompassed within the scope of the present invention.

In use, the stabilizer loop 2 can be folded toward the upper end 18 of the monopod 3 (FIG. 1) and the monopod 3 telescopically collapsed for compact transportation of the apparatus 1. It is foreseen that the number of monopod section 12 and their length can be adjusted so that the size of the apparatus 1, as reduced, is suitable for packing in a suitcase sized carrier, similar to the types of cases provided by Pelican Products, Inc. (www.pelican.com) and other sources. The spacing of the camera support bore axis S of the clamp structure 4 from the frame clamp bore axis F is such that when the loop 2 is folded down parallel to the monopod 3, there is a space between the loop 2 and the monopod 3. Such space between the loop 2 and monopod 3 can be used to hook the apparatus 1 over a horizontal structure, such as a fence rail 72 (FIG. 3) to provide a stationary support for the apparatus 1.

Figure 11:
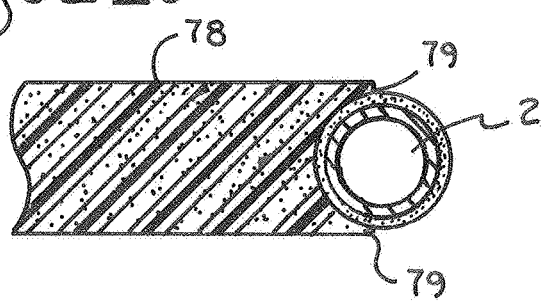
FIG. 11 is a greatly enlarged fragmentary cross sectional view of a portion of a seat cushion for the stabilizer frame.

With lower sections 12 of the monopod 3 retracted somewhat, the loop 2 can be angled perpendicular to the monopod 3, the loop 2 can be placed on a horizontal structure, such as a bleacher seat 76 (FIG. 4) and sat on by the photographer to provide stabile support for the apparatus 1. The loop 2 can be provided with a seat cushion 78 extending across the loop 2 for more comfortable sitting on the loop 2. It is foreseen that such a seat cushion 78 can be selectively removable from the loop 2, as needed. The cushion 78 may have edges 79 (FIG. 11) which overlap the loop 2 to retain the cushion 78 within the loop 2. Referring to FIG. 5, the sections 12 of the monopod 3 can be collapsed and the loop 2 positioned at an angle to provide stabile support for a camera 10 with the apparatus 1 positioned on a floor or the ground. Referring to FIG. 7, the loop 2 can be angled outward from the monopod 3, such as perpendicularly, and the lower end 22 of the monopod 3, fully extended, and the loop 2 can be grasped to use the apparatus 1 in the manner of a camera boom.

Referring to FIG. 8, the apparatus 1 is shown in use with a belt worn flagpole support cup 82 of the type used for carrying flags in parades. The stabilizer loop 2 can be oriented for grasping by one or both hands of the photographer to provide elevated support for the camera 10 mounted on the top end 18 of the monopod 3. Such usage can be for photographing subjects at an elevated position, for example, or for a perspective above a crowd of people at an event.

FIG. 9 shows the apparatus 1 in use by a photographer seated in a wheelchair 86. The stabilizer loop 2 (not shown in FIG. 9) can be oriented relative to the monopod 3 to enable the photographer to sit on the loop to thereby stabilize a camera 10 supported by the apparatus.

FIG. 10 shows the apparatus 1 in use to support a camera 10 using a ladder 90, such as a step ladder. The stabilizer loop 2 may be oriented horizontally and rested on a rung or step of the ladder 90 or on a top of the ladder. It is foreseen that a photographer may sit on the loop 2 to further stabilize the camera 10 mounted on the monopod 3.

Figure 13:
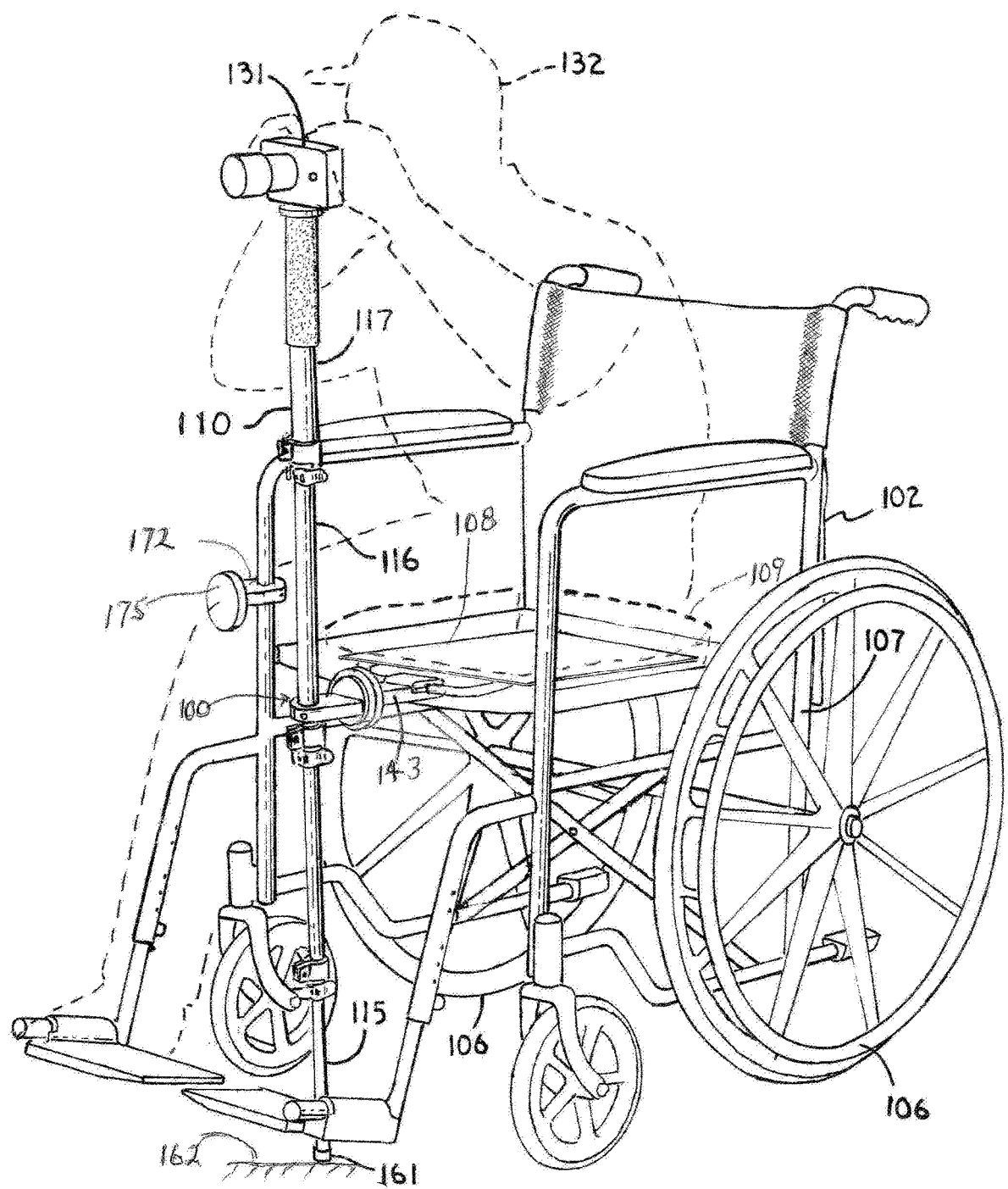
FIG. 13 is a perspective view of the support showing the pad positioned under a seat cushion of a wheelchair and with the monopod joined to the pad with a user shown in phantom.
Figure 14:
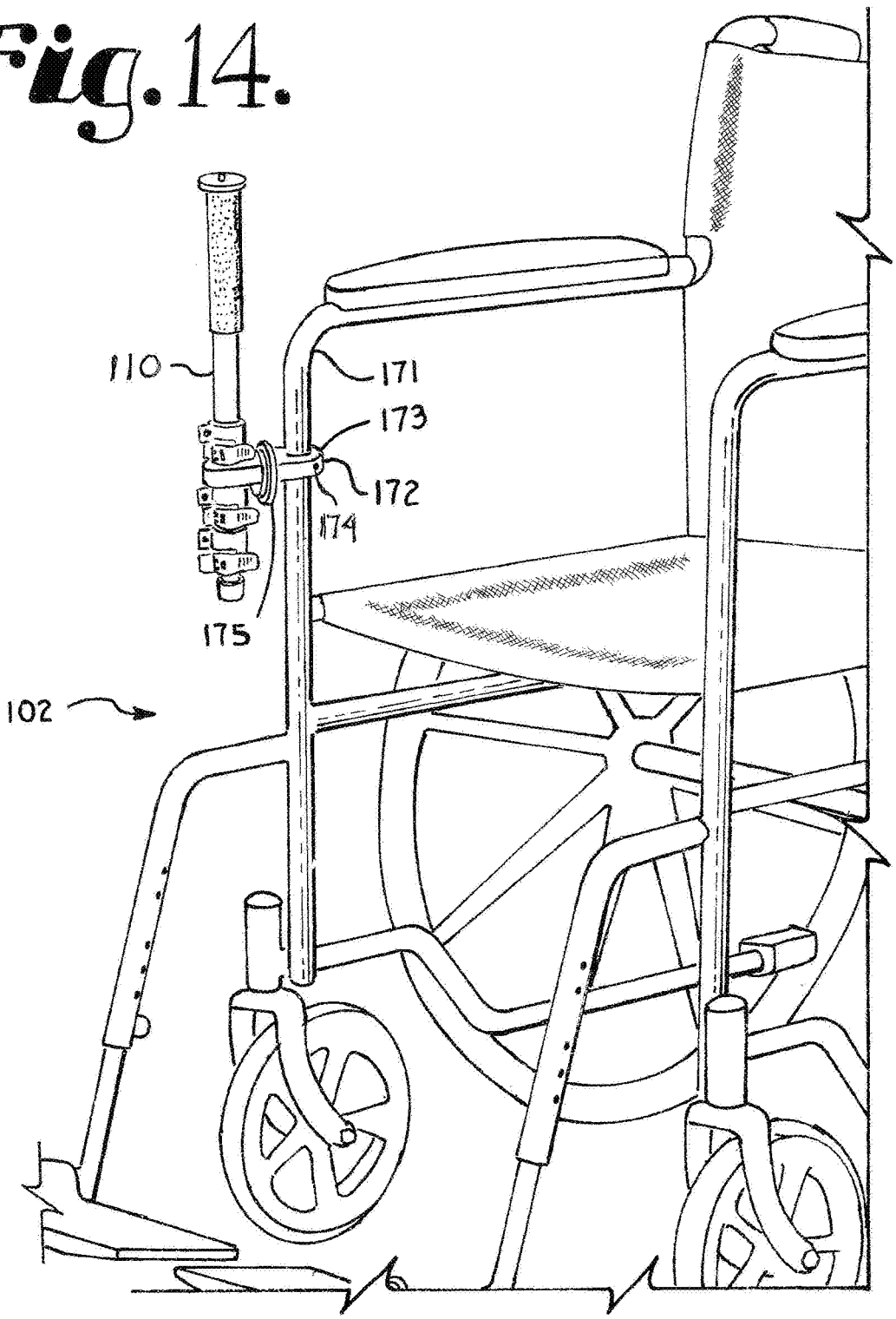
FIG. 14 is a perspective view of the support shown on a wheelchair with the monopod mounted to the side of the wheelchair and the pad removed.

Illustrated in FIGS. 12 to 14 is a second embodiment of a camera stabilizer 100 in accordance with the present invention. The stabilizer 100 is especially adapted for use in conjunction with a user in a wheelchair type device including conventional wheelchairs, motorized scooters and the like.

The wheelchair 102 has a pair of rotatable support and drive wheels 106 supporting a frame 107 having a seat 108. It is foreseen that the seat may be many different types including sling and pan seats. In some instances, the seat 108 is preferably covered by a cushion 109 or the like.

A monopod 110 is best shown in FIG. 12. The illustrated monopod 110 is elongate with three collapsible or telescoping sections 115, 116, and 117 that are adjustable at locable junctures 118, 119, and 120. Located at on top end of the monopod 110 is a camera mount 130 for mounting a camera 131 seen being used by an operator 132 (shown in phantom) setting in the wheelchair 102 in FIG. 13.

The support mechanism 100 includes a pad 140, a magnet 141, a metal target or receiver 142 selectively attachable to the magnet 141 and a shaft 143 joining the magnet 141 to the pad 140. It is foreseen that the magnet 141 and receiver 142 for the magnet 141 may be interchangeable. The receiver 142 is constructed of a material, such as iron, that is attracted to magnets.

The pad 140 includes a generally flat or planar surfaced structure 144 that is comparatively thin with respect to the side to side dimensions of the pad 140 and is sized and shaped to be set upon by the user 132 while positioned on the seat 108 of the wheelchair 102 either with the user 132 directly engaging or with the cushion 109 therebetween. The pad 140 has a forward projecting pair of tubes 150 and 151 forming a yoke fixedly and rigidly joined by a connector 152 at the front thereof. The connector 152 is rigidly joined to the shaft 143 by screws or the like and in turn the shaft 143 is affixed and rigidly joined to the magnet 141. The magnet 141 has a diameter of several inches (preferably 2 inches) and is held in a fixed position relative to the pad 140 by the structure therebetween.

The receiver 142 which is magnetically attracted to the magnet 141 when in close proximity thereto is securely and rigidly attached to the monopod 110 by a clamp structure or joining member 160 that is adhered to the monopod 110 by welding, gluing or the like and is preferably adhered by a locking screw 161 that prevents easy rotation of the shaft 160 relative to the monopod 110. The receiver 142 is approximately the same diameter as the magnet 141; however, it may be larger to reduce the likelihood of pinching caused by the magnet, for example, three inches in diameter. When the magnet 141 and receiver 142 are joined, the monopod 110 is held securely and rigidly in a fixed position relative to the pad 140 both from side to side and up and down. In use, the monopod 110 may rest on a bottom 161 of the monopod 110 on the ground 162, although the monopod 100 will not be extended to the ground 162 in all uses, especially where it is intended for the wheelchair 102 to be in motion during use of the camera 131.

The magnet 141 is any suitable magnet that will hold the monopod 110 stable in use, but is preferably of a rare earth type using elements such as neodymium, samarium-cobalt and other rare-earth combinations. Preferably, the magnet 141 has a magnetic field exceeding 1.4 Teslas and is plated or coated to protect the grainy nature of such magnets and to resist rust. The monopod 110 can be disconnected from the pad 140 at the magnet 141 by the user 132 sliding the monopod 110 sideways and twisting while pushing the magnet 141 and receiver 142 apart. When joining the magnet 141 and receiver 142, care must be taken to not place fingers therebetween as the magnetic strength is sufficient to pinch fingers.

Shown in FIG. 14 is a side mount 172 that is securely mounted on or attached to an arm 171 or other structure on the side of the wheelchair 102. The side mount 172 includes a mounting structure 173 and is securely attached by welding, gluing or the like and in the illustrated embodiment by a locking screw 134 to the arm 171. The side mount 172 includes a magnet 175 of the same type as magnet 141 or at least able to hold the monopod 110. Again, if the magnet 141 and receiver 142 are reversed, then this element would be of the same material as the receiver 142. When the monopod 110 is removed from the magnet 141 it can then be mounted to the side mount magnet 175 on the side of the wheelchair 102 where it remains available, but out of the way, especially should the user decide to exit the wheelchair 102. As shown in FIG. 14, the monopod 110 is also collapsed so as to reduce its profile, but remain available for use.

The pad 140, shaft 143, and magnet 141 form an overall center mounting assembly 180 that allows the monopod 110 to be center mounted. Such a center mounting provides greater stability than side mounted supports that may rotate into a use position, but do not provide sufficient horizontal stability against vibration. The center mount assembly 180 also allows a user 132 to enter and exit the wheelchair 102 without obstruction when the monopod 110 is removed and preferably placed on the side mount 172. To remove the monopod 110 from the side mount 172, the prior process is reused with the monopod 110 being rotated out of alignment with the mount 172 and then quickly pushed to the side. The stabilizer assembly 180 can be moved backward and forward relative to the seat 108 to adjust for the body size and arm length of the user 132.

It is to be understood that while certain forms of the present invention have been described and illustrated herein, it is not to be limited to the specific forms or arrangement of parts described and shown.

What is claimed and desired to be secured by Letters Patent is:

1. A camera support comprising:
   a) a pad adapted to be sat upon by a user and including a surface area sufficiently large to support the user when in use;
   b) a shaft extending forwardly from a side of the pad; the shaft being fixedly secured to the pad at a first end thereof and adapted to extend between the legs of a user sitting on the pad; the shaft being center mounted so as to be adapted to extend forward of the center of a user when in use;
   c) a first of a magnet or a magnetically attracted material being fixedly attached to a second end of the shaft opposite the first end of the shaft;
   d) the magnet is a rare-earth magnet producing a magnetic field of at least 1.4 Teslas and is fixedly mounted on the shaft;
   e) the magnet has a first surface that engages a second surface located on the magnetically attracted material with the first surface being smaller than the second surface and further both the first and second surfaces being smooth so as to allow a user to slide the two surfaces relative to each other and then twist them relative to each other to allow a user to separate the two surfaces without pinching the user;
   f) a monopod including an elongate shaft that is adjustable in length with a camera mount at one end thereof and positionable to extend vertically from a support selected from the ground and a lower portion of a wheelchair; and
   g) a joining member securely attached to the monopod medially therealong and including a receiver constructed of a second of the magnet or the magnetically attracted material, such that in use the magnet and magnetically attracted material are joined to rigidly support the monopod relative to the pad and are fully removably disconnectable so as to allow removal of the monopod from the pad; and the monopod is held vertically stable to prevent vertical vibration at the camera support.

2. The support according to claim 1 in combination with a wheelchair wherein the pad is placed under the cushion of a wheelchair seat and the monopod is supported by a footrest of the wheelchair.

3. The support according to claim 2 wherein:
   a) the wheelchair includes a side mount securely attached to a side of the chair that is constructed of the first of the magnet or magnetically attracted material that is secured to the pad and is positioned to support the monopod to the side of the chair when the monopod is disconnected from the pad.

4. In combination a monopod for supporting a camera, a wheelchair and a support operably securing the monopod to the wheelchair comprising:
   a) a pad adapted to be sat upon by a user and including a surface area sufficiently large to support the user when in use;
   b) a shaft extending forwardly from a side of the pad and being center mounted with respect to the position of a user of the wheelchair; the shaft being fixedly connected to the pad at a first end thereof and adapted to extend between the legs of a user sitting on the pad;
   c) a first of a magnet or a magnetically attracted material that is fixedly attached to a second end of the shaft opposite the first end of the shaft;
   d) the magnet is a rare-earth magnet producing a magnetic field of at least 1.4 Teslas and is fixedly mounted on the shaft;
   e) the magnet has a first surface that engages a second surface located on the magnetically attracted material with the first surface being smaller than the second surface and further both the first and second surfaces being smooth so as to allow a user to slide the two surfaces relative to each other and then twist them relative to each other to allow a user to separate the two surfaces without pinching the user;

f) a monopod including an elongate shaft that is adjustable in length with a camera type mount at one end thereof and positionable to extend vertically from a support selected from the ground and a lower portion of a wheelchair; and g) a joining member securely attached to the monopod medially therealong and constructed of a second of the magnet or the magnetically attracted material, such that in use the magnet and magnetically attracted material are joined to rigidly support the monopod relative to the pad and are fully removably disconnectable so as to allow removal of the monopod from the pad and the monopod is held vertically stable to prevent vertical vibration at the camera support.

5. The combination according to claim 4 including:

a) a side mount secured to an arm of the wheelchair and being adapted to selectively receive the monopod and hold the monopod in a position so the monopod does not interfere with entry into or exit from the wheelchair by a user.

\* \* \* \* \*